(12) United States Patent
Hessler et al.

(10) Patent No.: US 11,381,360 B2
(45) Date of Patent: Jul. 5, 2022

(54) PT-RS CONFIGURATION DEPENDING ON SCHEDULING PARAMETERS

(71) Applicant: Telefonaktiebolaget LM Ericsson (publ), Stockholm (SE)

(72) Inventors: Martin Hessler, Linköping (SE); Mattias Frenne, Uppsala (SE); Peter Hammarberg, Mölndal (SE); Lars Lindbom, Karlstad (SE); Vicent Molés Cases, Nules (ES); Zhao Wang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/682,664

(22) Filed: Nov. 13, 2019

(65) Prior Publication Data

US 2020/0153580 A1    May 14, 2020

Related U.S. Application Data

(63) Continuation of application No. 16/367,440, filed on Mar. 28, 2019, now Pat. No. 10,505,686, which is a
(Continued)

(51) Int. Cl.
*H04L 5/00* (2006.01)
*H04L 1/00* (2006.01)
(Continued)

(52) U.S. Cl.
CPC .......... *H04L 5/0048* (2013.01); *H04L 1/0005* (2013.01); *H04L 1/0011* (2013.01);
(Continued)

(58) Field of Classification Search
CPC ... H04L 5/0048; H04L 1/0005; H04L 1/0011; H04L 1/0027; H04L 5/0007;
(Continued)

(56) References Cited

U.S. PATENT DOCUMENTS

| 8,261,169 B2 | 9/2012 | Kishigami et al. |
| 10,116,483 B2 | 10/2018 | Islam et al. |

(Continued)

FOREIGN PATENT DOCUMENTS

| CN | 103548409 A | 1/2014 |
| CN | 103959839 A | 7/2014 |

(Continued)

OTHER PUBLICATIONS

English-language translation of Guo's priority application CN 201610876822.5 (CN201610876822A) (Year: 2021).*
(Continued)

*Primary Examiner* — Chi H Pham
*Assistant Examiner* — Weibin Huang
(74) *Attorney, Agent, or Firm* — Murphy, Bilak & Homiller, PLLC

(57) ABSTRACT

There is disclosed a transmitting node for a Radio Access Network, the transmitting node being adapted for transmitting, based on one or more transmission parameters, of reference signaling, and/or signaling including reference signaling, wherein the reference signaling comprises phase tracking reference signaling, and the one or more transmission parameters comprise a Modulation and Coding Scheme (MCS).

9 Claims, 12 Drawing Sheets

Related U.S. Application Data continuation of application No. PCT/SE2017/051105, filed on Nov. 6, 2017.

(60) Provisional application No. 62/417,659, filed on Nov. 4, 2016.

(51) Int. Cl.

| | | |
|---|---|---|
| *H04L 27/26* | (2006.01) | |
| *H04W 56/00* | (2009.01) | |
| *H04W 72/12* | (2009.01) | |
| *H04L 27/00* | (2006.01) | |
| *H04B 7/10* | (2017.01) | |
| *H04B 7/0452* | (2017.01) | |

(52) U.S. Cl.
CPC .......... *H04L 1/0027* (2013.01); *H04L 5/0007* (2013.01); *H04L 5/0053* (2013.01); *H04L 5/0094* (2013.01); *H04L 27/2613* (2013.01); *H04L 27/2655* (2013.01); *H04W 56/00* (2013.01); *H04W 72/1268* (2013.01); *H04W 72/1289* (2013.01); *H04B 7/0452* (2013.01); *H04B 7/10* (2013.01); *H04L 27/2657* (2013.01); *H04L 2027/0026* (2013.01)

(58) Field of Classification Search
CPC . H04L 5/0053; H04L 5/0094; H04L 27/2613; H04L 27/2655; H04W 56/00; H04W 72/1268; H04W 72/1289
See application file for complete search history.

(56) References Cited

U.S. PATENT DOCUMENTS

| | | | | |
|---|---|---|---|---|
| 10,505,686 | B2* | 12/2019 | Hessler | H04L 5/0007 |
| 2009/0296644 | A1* | 12/2009 | Cheon | H04L 1/1822 |
| | | | | 370/328 |
| 2010/0322332 | A1 | 12/2010 | Zheng | |
| 2011/0158200 | A1 | 6/2011 | Bachu et al. | |
| 2015/0358132 | A1 | 12/2015 | Wallen et al. | |
| 2016/0094372 | A1* | 3/2016 | Jitsukawa | H04L 25/022 |
| | | | | 375/322 |
| 2016/0142175 | A1 | 5/2016 | Waheed et al. | |
| 2018/0091350 | A1 | 3/2018 | Akkarakaran et al. | |
| 2018/0351719 | A1* | 12/2018 | Lee | H04L 5/0048 |
| 2018/0367202 | A1* | 12/2018 | Yang | H04L 5/0044 |
| 2019/0149295 | A1 | 5/2019 | Wang et al. | |
| 2019/0222386 | A1* | 7/2019 | Guo | H04W 72/12 |
| 2019/0238247 | A1* | 8/2019 | Lee | H04L 27/12 |
| 2020/0106584 | A1* | 4/2020 | Jiang | H04L 1/0016 |

FOREIGN PATENT DOCUMENTS

| | | |
|---|---|---|
| CN | 104396202 A | 3/2015 |
| CN | 104769870 A | 7/2015 |
| CN | 105830379 A | 8/2016 |
| JP | H1138112 A | 2/1999 |
| JP | 2016518758 A | 6/2016 |
| JP | 2019537892 A | 12/2019 |
| RU | 2380845 C2 | 1/2010 |
| WO | 2015142932 A1 | 9/2015 |

OTHER PUBLICATIONS

English-language translation of Guo's priority application CN 201610876822.5 (CN201610876822A) (Year: 2021) (Year: 2021).*

Unknown, Author, "Discussion on phase noise compensation RS for NR", CATT, 3GPP TSG RAN WG1 Meeting #86bis, R1-1608781, Lisbon, Portugal, Oct. 10-14, 2016, pp. 1-2.

Unknown, Author, "Phase Noise Measurement/Modeling and LLS for High Frequency Numerology", CMCC, 3GPP TSG RAN WG 1 Meeting #86bis, R1-167106, Goteborg, Sweden, Aug. 22-26, 2016, pp. 1-12.

Unknown, Author, "Reference signal design for phase noise compensation in HF", Huawei, HiSilicon, 3GPP TSG RAN WGI Meeting #86bis, R1-1608822, Lisbon, Portugal, Oct. 10-14, 2016, pp. 1-5.

Unknown, Author, "Study of Phase Noise Tracking", Intel Corporation, 3GPP TSG-RAN WG1 #86bis, R1-1609529, Lisbon, Portugal, Oct. 10-14, 2016, pp. 1-7.

Unknown, Author , "Further details for PT-RS design", 3GPP TSG RAN WG1 Meeting Ad Hoc for NR, R1-1700073, Spokane, USA, Huawei, HiSilicon, Jan. 16-20, 2017, 1-5.

* cited by examiner

PT-RS CONFIGURATION DEPENDING ON SCHEDULING PARAMETERS

TECHNICAL FIELD

The present disclosure pertains to wireless communication technology, in particular radio access technology (RAT) and/or a radio access network (RAN), which may be a 5G network, e.g. according to 3GPP/NR (New Radio).

BACKGROUND

The physical layer of NR (the 3GPP 5G mobile radio systems) is expected to handle a vast number of different transmission scenarios by supporting multiple transmission numerologies, variable data transmission time intervals and early decoding for latency critical applications. These new scenarios impose a need for the physical layer to be even more flexible than the case when LTE was first designed. In addition to these new transmission scenarios, the physical layer of NR should be able to handle different transmission characteristics in terms of large variations in SINR, Doppler, delay spreads and channel richness.

In mobile radio systems, reference signals for coherent demodulation of physical layer control and data channels signals may be transmitted within an OFDM waveform. The reference signal (RS) is multiplexed with the physical layer channels and mapped on the OFDM time-frequency resource grid as configured by the network. In LTE downlink, the demodulation can be based on either cell-specific RS (CRS) or UE-specific RS (e.g. DM-RS), the type of which to be used depends on configured transmission mode. The mapping of CRS on the time-frequency resource grid follows from the transmit-antenna configuration together with a cell-specific frequency shift, derived during initial access, whereas the DM-RS mapping depends on the number of MIMO-layers.

The UE-specifically configured DM-RS can be pre-coded in the same way as the corresponding physical layer channels and dynamically adapt the number of MIMO-layers to the radio channel conditions. Hence, one DM-RS antenna port is used per spatial MIMO layer scheduled to the UE. An antenna port is associated to a given RS pattern of resource elements over a time and frequency region. Different antenna ports may map to different resource elements to provide orthogonality.

Each transmitted MIMO layer thus has one associated DM-RS antenna port, and, since the data transmitted in that layer is precoded with the same precoder as the associated DM-RS, it is said that the data is transmitted on the associated DM-RS antenna port. The receiver will use the associated antenna port when demodulating the data of a layer.

It may be preferable if different antenna ports are orthogonal when transmitted, as it gives better channel estimation performance at the receiver. This can be achieved by separation in time and frequency (different resource elements) or by using a combination with orthogonal cover codes (OCC) across multiple resource elements in time or frequency.

With DM-RS, LTE supports up to 8-MIMO layers in downlink by using OCC in time.

FIG. 1 exemplarily illustrates the mapping of CRS and DM-RS patterns.

Like LTE, NR will be using OFDM based waveforms with reference signals and physical layer channels mapped on a time-frequency resource grid (in particular, for DL, in UL a special form of OFDM may be used, SC-FDM). Reference signals to be used in NR for demodulation of physical layer channels have not yet been specified but will primarily be based on UE-specifically configured DM-RS patterns that can support multiple transmission numerologies, variable data transmission time intervals and early decoding for latency critical applications.

FIG. 2 shows DM-RS structures that have been discussed to meet requirements of early decoding or for low Doppler/low UE mobility (e.g., low relative speed). In this structure, the early transmission of DM-RS enables demodulation and decoding of data to start almost directly after receiving the second OFDM symbol in the slot.

SUMMARY

It is an object of this disclosure to provide approaches allowing improved handling of reference signaling, in particular PT-RS. The approaches in some aspects may facilitate low overhead for configuring and/or adaptive correction for phase errors.

There is disclosed a transmitting node for a Radio Access Network, the transmitting node being adapted for transmitting, based on one or more transmission parameters, of reference signaling and/or signaling including reference signaling. The reference signaling comprises phase tracking reference signaling, and the one or more transmission parameters comprise a Modulation and Coding Scheme, MCS.

Also, a method for operating a transmitting node in a Radio Access Network, the method comprises transmitting, based on one or more transmission parameters, of reference signaling and/or signaling including reference signaling. The reference signaling comprises phase tracking reference signaling, and the one or more transmission parameters comprise a Modulation and Coding Scheme, MCS.

The one or more transmission parameters may pertain to transmission by the transmitting node, e.g. according to a configuration, and/or to a specific channel like a physical channel, e.g. a data channel like a Physical Uplink Shared CHannel like PUSCH, or a Physical Downlink Shared Channel like PDSCH, or a control channel like a physical uplink or downlink control channel like PUCCH or PDCCH.

Accordingly, no additional signaling is needed to indicate whether and/or how the reference signaling is to be transmitted.

In general, the one or more transmission parameters may be configured or indicated with a control message, in particular a DCI message. Transmission of reference signaling like phase tracking reference signaling may be based on a reference signaling configuration. The configuration may be indicated by the control message, e.g. a MCS indication therein. A MCS indication may generally comprise an indicator or index or pointer or value or bit field indicating a MCS type and/or a MCS to be used or used for transmission. A transmission parameter may be configured or scheduled, and may be considered a scheduling parameter.

The transmitting node may be a radio node, in particular a terminal or a network node. A receiving node receiving the reference signaling or associated transmission may be complementary thereto a network node or a terminal.

In some cases, transmitting may be in downlink, and/or may be terminal-specific and/or beam-formed.

Phase tracking reference signaling may be on one or more subcarriers, e.g. associated to a carrier or carrier frequency. The one or more subcarriers may be carriers for which also demodulation reference signaling (DM-RS) is scheduled, e.g. for the same slot or subframe, and/or leading in time compared to the phase tracking reference signaling.

There is also disclosed a program product comprising code executable by control circuitry, the code causing the control circuitry to carry out and/or control a method as described herein.

Moreover, a carrier medium arrangement carrying and/or storing a program product as disclosed herein is described.

Alternative or additional approaches are also discussed in the following.

BRIEF DESCRIPTION OF THE DRAWINGS

The drawings are provided merely to illustrate concepts and approaches described herein, and are not intended to limit their scope. The drawings comprise.

DETAILED DESCRIPTION

In the following, approaches are described with a focus on NR technology. However, they are applicable to other systems as well.

Figure 1:
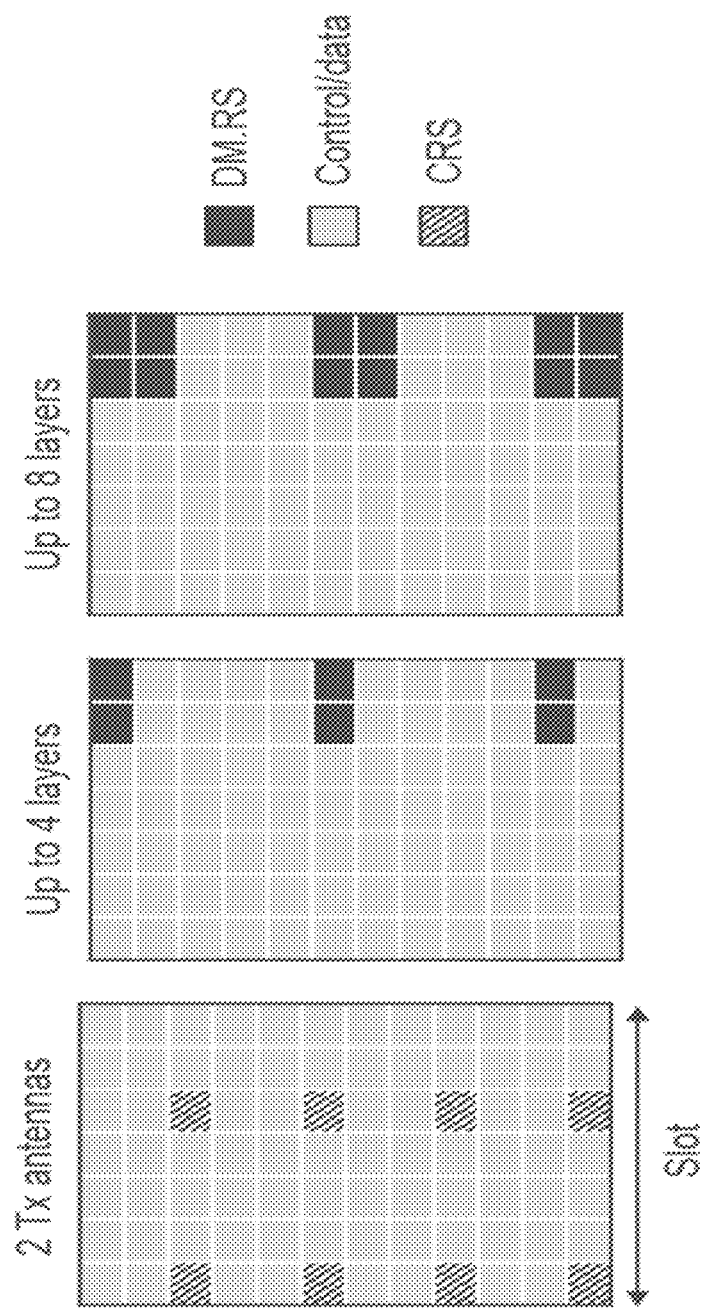
FIG. 1, showing an illustration of CRS and DM-RS patterns in LTE.
Figure 2:
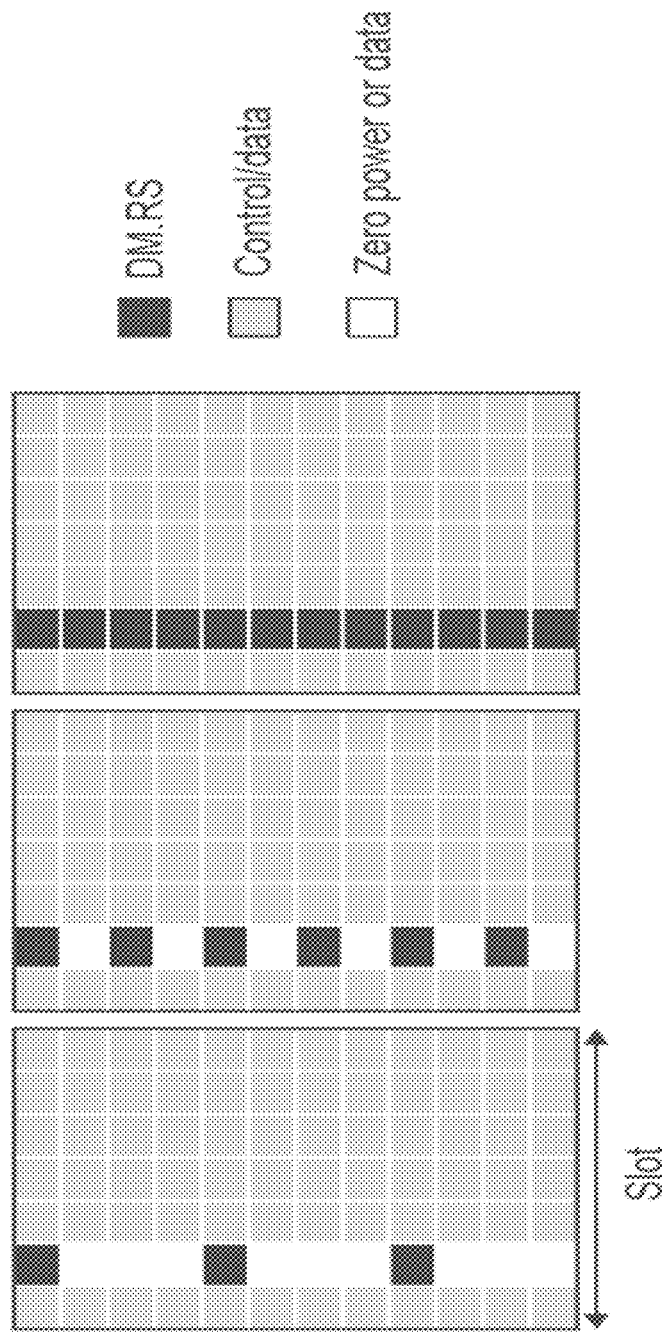
FIG. 2, showing possible DM-RS patterns in NR for supporting early decoding/low Doppler.
Figure 3:
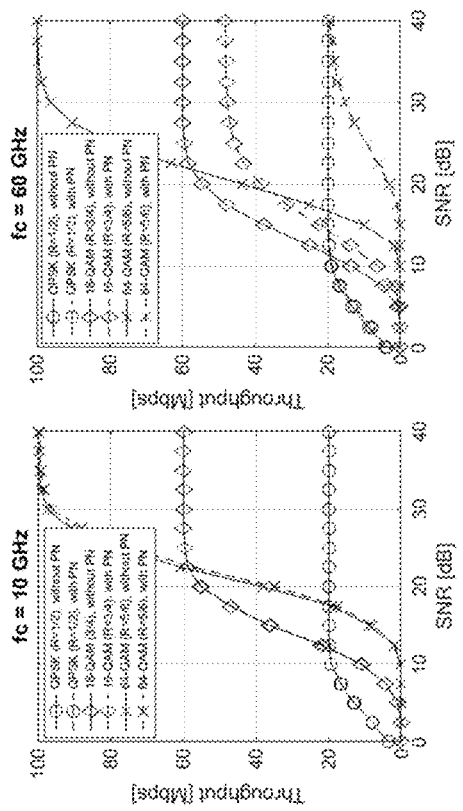
FIG. 3, showing phase noise induced errors at carrier frequency of 10 and 60 GHz, for different modulation and coding schemes.

In NR deployments at higher carrier frequencies, the radio link will exhibit some new properties compared to LTE which is deployed at much lower carrier frequencies, than targeted in NR. One of the fundamental changes is that the phase noise induced problems increase with the carrier frequency, which introduces a need for a new phase reference signal PT-RS (Phase Tracking RS). Such signal can be used both for mitigation of the phase noise induced common phase error, experienced equally on all subcarriers within an OFDM symbol, and inter-carrier interference (ICI) caused by the loss of orthogonality between subcarriers. The impact of phase noise is depicted in FIG. 3, where the link throughput with and without phase noise is shown at carrier frequencies of 10 and 60 GHZ, for different coding and modulation schemes. At 10 GHz, phase noise has a limited impact on performance, while at 60 GHz significant performance loss is observed when communicating with higher order constellations, such as 64QAM. The figure shows that the PT-RS signal, used for reducing the phase noise impact, is mainly beneficial at certain MCSs and carrier frequencies.

Figure 4:
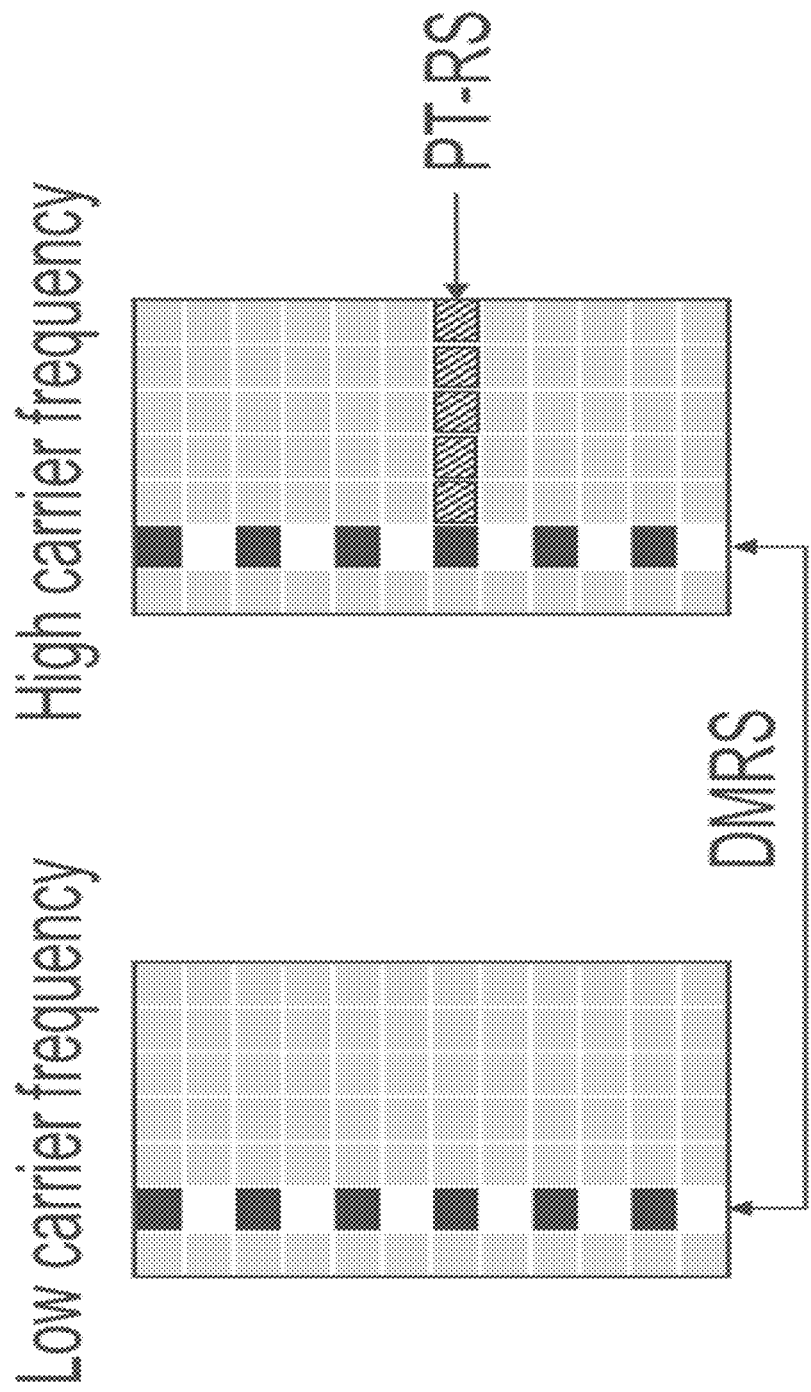
FIG. 4, showing addition of PT-RS at high carrier frequency in NR.

This PT-RS reference signal can be needed both in uplink and downlink. It is foreseen that this signal can be used for both fine carrier frequency-synchronization, and phase noise compensation. This signal is assumed to present and needed only at high carrier frequencies, while the other properties of the DM-RS can remain somewhat unchanged. An example of adding PT-RS at high carrier frequencies is depicted in FIG. 4.

Always adding an PT-RS at higher frequencies causes additional overhead, whereas semi-statically configuring the PT-RS causes the system to be less agile in adopting to changes in transmission conditions. Accordingly, it is suggested dynamically indicating the PT-RS configuration using, e.g., one or more scheduling parameters, such as an indication of the MCS or the number of scheduled MIMO layers. It is observed that in some cases PT-RS can be absent, leading to negligible demodulation performance degradation but reduced overhead, in summary an improved user data throughput.

The use of an adaptive PT-RS is very efficient as there is a direct correspondence between the achieved SINR and the selected MCS, further there is a direct correspondence between the need for CPE and SINR and used modulation scheme (e.g. QPSK, 16 QAM and 64-QAM). For example, if the MCS changes quickly due to a change in the number of co-scheduled users, no re-configuration is needed of for the PT-RS. With the proposed solution, adjusting the MCS due to the co-scheduling directly gives the correct configuration of PT-RS.

Moreover, when multiple MIMO layers are scheduled to the same UE, then the need for accurate channel estimate is higher and PT-RS is useful to assist the UE in performing inter-layer interference suppression.

Generally, there may be considered a transmitting node for a wireless communication network and/or for a Radio Access Network. The transmitting node may be adapted for transmitting reference signaling, and/or signaling including reference signaling. Reference signaling may in particular comprise or be phase tracking reference signaling like PT-RS. The transmitting and/or the reference signaling and/or a reference signaling configuration of the reference signaling may be based on one or more transmission parameters, e.g. of the transmitted signaling, and/or be based on link adaptation used. The transmitting node may comprise a correspondingly adapted transmitting circuitry used for such transmitting, and/or a correspondingly adapted transmitting module. Alternatively, or additionally, the transmitting node may be adapted for indicating, e.g., to a terminal, a reference signaling configuration, e.g. implicitly or explicitly. The node may comprise a corresponding indicating module, and/or transmitting circuitry may be used therefor. More alternatively or additionally, the transmitting node may be adapted for determining a reference signaling configuration to be used for transmission based on one or more transmission parameters. The transmitting node may comprise correspondingly adapted control circuitry and/or a determining module. Transmitting signaling (which may include reference signaling) and/or transmitting reference signaling may be based on such configuration. The reference signaling configuration may pertain to reference signaling to be transmitted by the transmitting node.

A method for operating a transmitting node for or in a wireless communication network and/or a Radio Access Network may be considered. The method may comprise transmitting reference signaling, and/or signaling including reference signaling. Reference signaling may in particular comprise or be phase tracking reference signaling like PT-RS. The transmitting and/or the reference signaling and/or a reference signaling configuration of the reference signaling may be based on one or more transmission parameters, e.g. of the transmitted signaling, and/or be based on link adaptation used. Alternatively, or additionally, the method may comprise indicating, e.g., to a terminal, a reference signaling configuration, e.g. implicitly or explicitly. More alternatively or additionally, the method may comprise determining a reference signaling configuration to be used for transmission based on one or more transmission parameters. The transmitting node may comprise correspondingly adapted control circuitry and/or a determining module. Transmitting signaling (which may include reference signaling) and/or transmitting reference signaling may be based on such configuration. The reference signaling configuration may pertain to reference signaling to be transmitted by the transmitting node.

There may be considered a method for operating a receiving node in a wireless communication network and/or a RAN. The method may comprise receiving reference signaling, in particular PT reference signaling, based on a reference signaling configuration, which may be a PT-RS configuration. Alternatively, or additionally, the method may comprise determining a reference signaling configuration, in particular a PT-RS configuration. The reference signaling configuration may pertain to reference signaling to be received by the receiving node.

A receiving node for a wireless communication network and/or a RAN may be considered. The receiving node may be adapted for receiving reference signaling, in particular PT reference signaling, based on a reference signaling configuration, which may be a PT-RS configuration. The receiving node may be adapted for using receiving circuitry (of the receiving node) for such receiving, and/or may comprise a corresponding receiving module. Alternatively, or additionally, the receiving node may be adapted for determining a reference signaling configuration, in particular a PT-RS configuration. The receiving node may be adapted for using control circuitry (of the receiving node) for such determining, and/or comprise a corresponding determining module. The reference signaling configuration may pertain to reference signaling to be received by the receiving node.

Alternatively, or additionally, there may be envisioned:

There may be generally considered a radio node for a wireless communication network and/or RAN, the radio node being adapted for receiving and/or transmitting PT-RS based on any of the patterns described herein. The radio node may comprise correspondingly adapted receiving and/or transmitting circuitry, and/or a corresponding transmitting or receiving module. A method for operating a radio node for a wireless communication network and/or RAN may be considered. The method may comprise receiving and/or transmitting PT-RS based on any of the patterns described herein. The radio node may be a terminal or a network node. Receiving and/or transmitting may be based on a reference signaling configuration, in particular a PT-RS configuration.

Receiving reference signaling may generally comprise evaluating reference signaling based on the reference signaling configuration and/or using reference signaling for handling received signaling associated to the reference signaling. Handling and/or evaluating may comprise measuring the RS, and/or decoding and/or demodulating signaling based on the RS and/or measurement of the RS. The receiving node may comprise an evaluating module for such evaluating, and/or control circuitry and/or radio circuitry may be adapted for such evaluating. In particular, radio circuitry (in particular, receiving circuitry) may comprise and/or be connected or connectable to measurement circuitry for corresponding measurements. It may generally be considered that receiving comprises and/or based on the reference signaling configuration is based on the assumption that the RS configuration identifies which parts of signaling are to be considered reference signaling, in particular PT-RS.

Signaling associated to reference signaling may be signaling transmitted or received in the same resource block and/or TTI (Transmission Time Interval) and/or subframe, and/or signaling to be decoded and/or demodulated based on the reference signaling. The signaling associated to reference signaling may occupy resources according to a prescription of the standard, which may identify which resources/signaling are to be handled based on which reference signaling. It may be considered that for each subcarrier in a carrier and/or resource block and/or subframe and/or TTI, there is one associated PT-RS on this subcarrier, such that signaling on resources associated to this subcarrier are handled based on this PT-RS signal.

A receiving node may generally be a radio node, in particular, a terminal. However, in some cases, in particular for networks adapted for terminals transmitting UL in OFDM (as opposed to DFT-OFDM), a receiving node may be a network node.

The reference signaling configuration may generally be a PT-RS configuration.

A reference signaling configuration (RS configuration), in particular a PT-RS configuration, generally may identify and/or described the reference signaling used, e.g. in terms of resources and/or distribution or pattern of signals over time/frequency, e.g., over a subframe and/or TTI, and/or related power and/or modulation. A reference signaling configuration may be indicated (e.g., explicitly) by one or more indicators, which may be transmitted in a control message, and for example indicate directly, and/or or index the configuration to a RS configuration table. Alternatively, or additionally, the RS configuration may be indicated by indication/s of one or more transmission parameters (e.g., in a control message). In this case, there may be defined a (e.g., unique) mapping of the one or more transmission parameters to a reference signaling, e.g. in a suitable table or function. Such mapping may be available at and/or implemented at a transmitting node and/or a receiving node. A RS configuration may indicate that no reference signaling of a specific kind, in particular PT-RS, is used, e.g. for a specific MCS. A RS configuration may be valid as long as the transmission parameter/s it is based on are valid and/or used.

Transmission parameters may generally describe characteristics of transmission, in particular physical characteristics. Transmission parameters may include parameters indicating modulation and/or coding, in particular a Modulation and Coding Scheme (MCS). The number of bits encoded in phase space, e.g. using QAM, may be seen as a transmission parameter. Transmission parameters may comprise frequency (or frequency range of transmission, e.g. carrier and/or subcarriers used and/or bandwidth). It may be considered that transmission parameters comprise resources, in particular time/frequency resources, e.g. scheduled resources. In some variants, transmission parameters may comprise a relation (e.g., ratio) between expected ICI and expected CPE. It may be considered that transmission parameters may comprise MIMO layer and/or transmission rank and/or parameters describing beam forming configuration, e.g. precoding and/or beam form (e.g., width and/or elevation). Transmission parameters may include scheduling information, in particular pertaining to other reference signaling to be transmitted, e.g. DM-RS.

A transmitting node may be a radio node, e.g. a network node. The transmitting may be in DL, and/or utilise OFDM. However, the transmitting node may in some cases be a terminal, which may transmit in UL and/or utilise OFDM or SC-FDM.

A control message may be a message comprising control information and/or scheduling information (e.g., representing resources scheduled), and/or indication/s of one or more transmission parameters. A control message may be a radio or physical layer message. It may be considered that a control message transmitted in UL is a UCI message (Uplink Control Information). A control message transmitted in downlink may be a DCI message (Downlink Control Information). Such messages may be according to a standard, e.g. a 3GPP standard like NR, and/or associated to the RAN utilised.

The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

Link adaptation generally may be considered to describe the adapting the MCS to operational conditions, e.g. based on interference, signal quality, signal-to noise or similar.

The reference signaling may comprise PT-RS and/or corresponding signals.

Generally, reference signaling, and/or a RS configuration, may be according to any of the approaches or proposals described herein, in particular regarding the pattern and/or resources to be used for RS.

In the following, the term "user equipment", or UE, may be considered a representation of the term "terminal", and these terms may be interchanged.

Precoding may refer to applying amplitude and/or phase shifts on each of the multiple antennas transmitting a signal, e.g. for beamforming. Such precoding may be based on and/or utilise a codebook, which may precoders, which may be pre-defined or alternatively dynamically defined, and/or a codebook may comprise a combination thereof.

Figure 5:
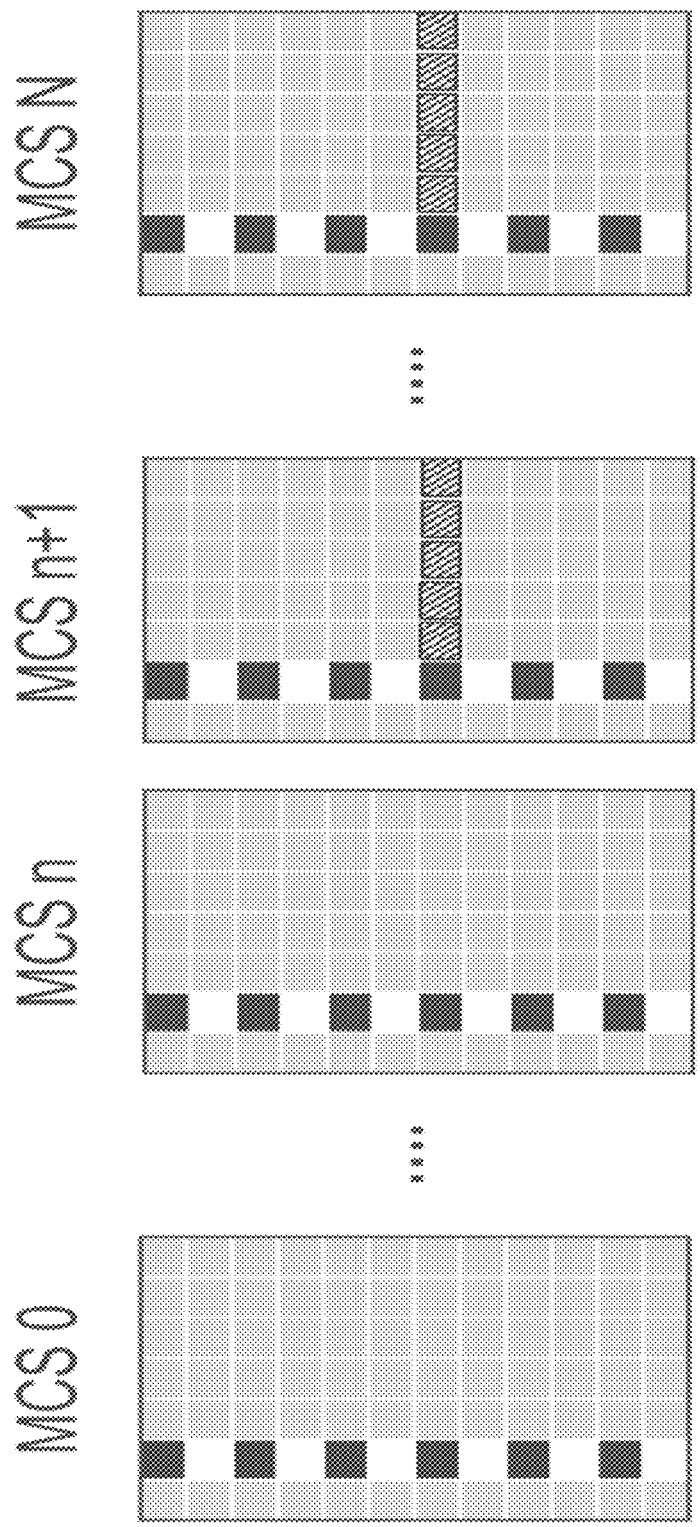
FIG. 5, showing MCS dependent PT-RS configuration.

As an example for the MCS dependent solution, in the basic case for a first range MCS 0 . . . n no PT-RS is configured, and for a second range MCS n+1 . . . N there is an PT-RS configured with a pre-determined or semi-statically configured frequency density, as depicted in FIG. 5. Accordingly, for a set of MCS selectable, for a first subset, PT-RS may be indicated to not be transmitted (e.g., 0 . . . n), and for a second subset, PT-RS may be indicated to be transmitted (e.g., n+1 . . . N). The set may be indicated to have (monotonous, or strict monotonous) increase in modulation order for higher n. Generally, an MCS may be indicated by a number and/or parameter, e.g. indexing a table. In some variants, the MCS indication may be adapted to indicate and/or select, multiple (at least two) MCS of the same type, e.g. with different associated and/or indicated PT-RS configurations, e.g. no PT-RS, PT-RS or different resource distributions and/or PT-RS densities selectable or indicatable for the MCS type. Such multiple MCS may be for one or more MCS types.

An MCS type may indicate the modulation to be used and/or the order of modulation. Examples of MCS types comprise BPSK, QPSK, QAM, e.g., I-QAM, with I for example 4 or 8 or 16 or 32 or 64 or 128 or 256, etc. High MCS may refer to an MCS type of a high order, e.g. 32 or more, low MCS may refer to an MCS type of low order, e.g. lower than 32. A comparison of high MCS with low MCS may generally be considered to imply that the high MCS is of higher order than the low MCS.

Figure 6:
FIG. 6, showing an exemplary flow diagram of a method for the two cases: A: reception; B: transmission.

An algorithm for implementation may comprise actions as shown in FIG. 6.

In an action S10, a control message like a DCI message may be received by a transmitting node like a terminal, respectively the message, and/or the associated control information, may be determined and/or transmitted by a receiving node like a network node. The control message or DCI may include an MCS indication. Optionally, it may indicate resources, e.g. time/frequency resources, for transmission, e.g. of data or control information, e.g. on a PUSCH and/or PUCCH. The resources may be indicated as a resource set, e.g. with a resource indication. In an optional action S12, a carrier frequency for the transmission may be determined and/or radio circuitry may be set (or kept) for transmission on the carrier frequency, e.g. based on stored information and/or a configuration, which may be static and/or semi-static. In an action S14, a PT-RS mapping may be determined. The mapping may indicate on which resources, e.g. of the resource set, the PT-RS are to be transmitted. The mapping may be determined based on the MCS indicated and the resource set and carrier frequency. A receiving node may perform an action S16A, of reception of signaling based on the mapping. The reception may comprise receiving considering the PT-RS mapping and time-delay, e.g. due to signal traveling time between transmitter and receiver. A transmitting node may perform an action S16B of transmission based on the PT-RS mapping, e.g. transmitting signaling including PT-RS. There may be considered a receiving node adapted for performing the actions associated to it. A transmitting node adapted for performing the actions associated to it may also be considered.

Figure 7:
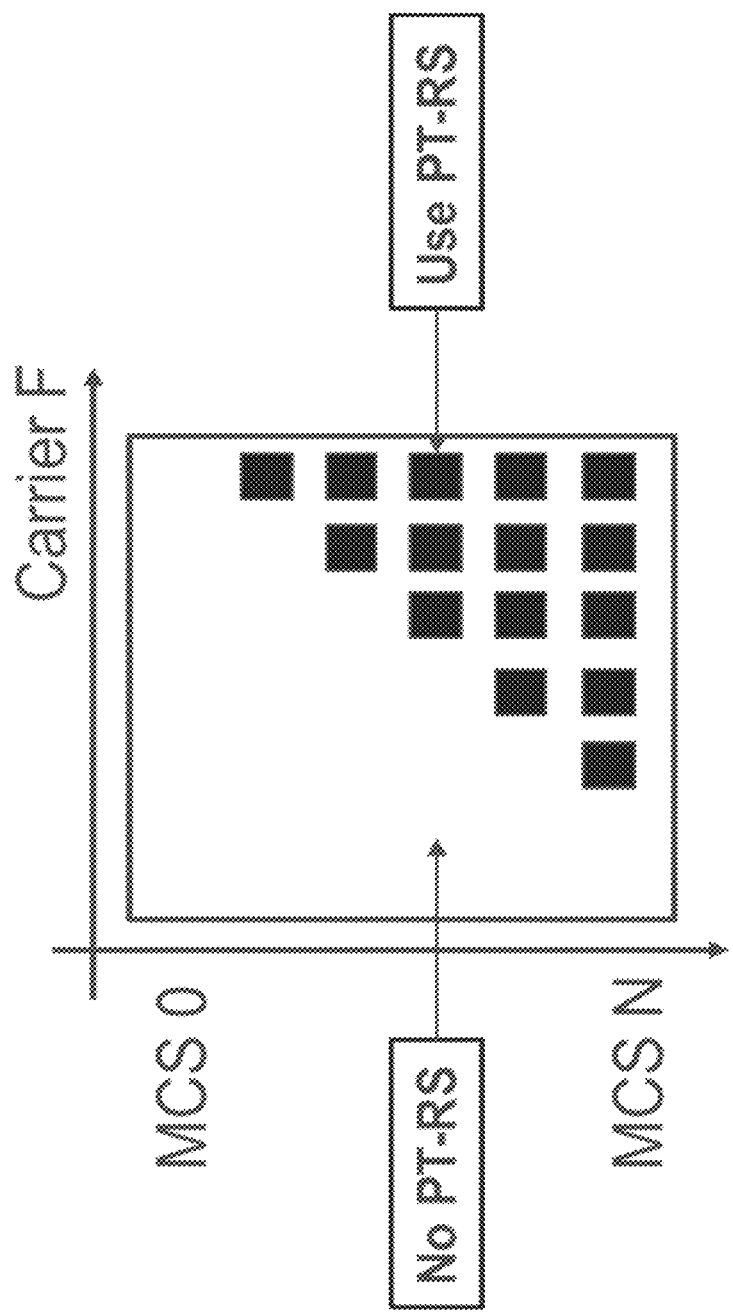
FIG. 7, showing PT-RS enabled for high MCS only; depending on carrier frequency F.

For an exemplary variant, a clear distinction for the MCS may be provided, i.e. the MCS table will extend the usage of PT-RS to lower and lower MCS as the carrier frequency is increasing, as depicted in FIG. 7.

In some variants, multiple different densities of PT-RS may be considered, as exemplarily discussed herein. In some cases, MCS with and without PT-RS may be interlaced, e.g. MCS indicated 0 . . . 4, 6, 8 use no PT-RS, but MCS 5, 7, 9 . . . N use PT-RS.

Likewise, the presence of PT-RS may depend on the number of scheduled MIMO layers to the UE. In one variant, PT-RS is present only when more than one layer is scheduled. In another variant, PT-RS may be present when a combination criteria using MCS and number of layers are both fulfilled. For instance, for high MCS and single layer, PT-RS may be present, and for multiple layers for any MCS it also may be present.

In another variant related to number of layers, multiple different densities of PT-RS may be defined, and the applicable density may depend on the number of scheduled layers.

A variant may consider PT-RS for CPE and extended PT-RS for CPE and ICI correction.

In some variants, there may be target scenarios where the carrier frequency is sufficiently high such that it is not sufficient to correct CPE, but rather more extensive phase noise compensation would be needed. ICI may produce a significant degradation of SIR at very high frequencies, and tends to increase strongly with increasing frequency. This implies that not only the common phase error needs correction, but rather correction is needed within one OFDM symbol to avoid excessive ICI. The approach could then still depend on MCS, but configure different PT-RS resource mappings. For example, for low MCS, use of no PT-RS may be indicated, for middle MCS, use of PT-RS sufficient for CPE compensation may be indicated, and for high MCS, use of an extended PT-RS resource configuration may be indicated, that enables compensating phase noise within the OFDM symbol, hence also mitigating the ICI.

A variant with MCS values for coverage using DFT-S-OFDM (which is also referred to as SC-FDM herein) in UL is discussed. NR will support both CP-OFDM and DFT-S-OFDM waveforms in UL. DFT-S-OFDM can be used, e.g., to achieve improved UL coverage when needed. The much lower peak-to-average power ratio (PAPR) of DFT-S-OFDM in comparison to CP-OFDM results in potentially higher average UE output power. One implication of DFT-S-OFDM is that reference signals should be time-multiplexed with physical layer channels to preserve low PAPR. Since CPE is changing per OFDM symbol, there is a complication of using PT-RS in the case of DFT-S-OFDM. This implies in some variants that some of the low MCS values may be used for better coverage and utilize DFT-S-OFDM, whereas higher MCS values may be used for data-rates and spectral efficiency. Hence, in some variants the coverage MCS are associated with DFT-S-OFDM, and in these cases no resources may be indicated or reserved for PT-RS transmissions.

It can be noticed that some low MCS values are potentially mapped to CP-OFDM and hence can have configured PT-RS. This is due to that in some cases low SINR can be targeted due to high interference rather than bad coverage.

Figure 8:
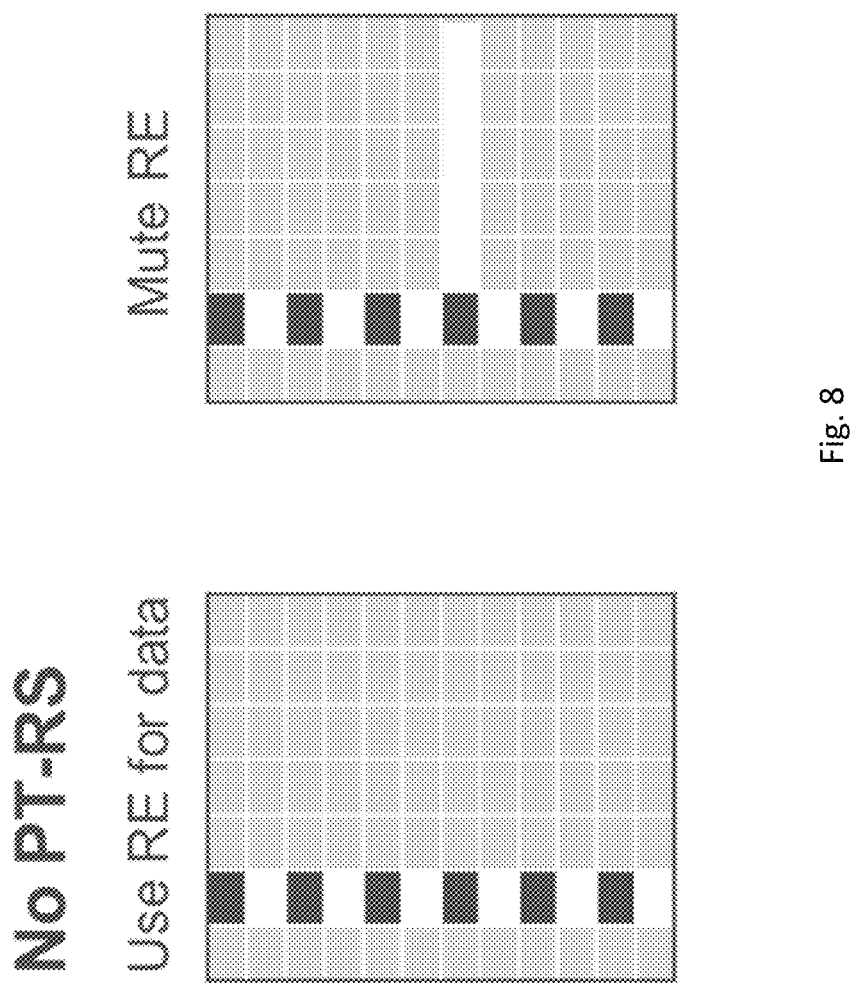
FIG. 8, showing "No PT-RS", either referred to mapping data instead of PT-RS or to muting (zero power) of the PT-RS resource elements.

A variant with muting resource elements to avoid interference is considered. In some variants, the overhead from PT-RS is not (or not only) in the number of resource elements required, but rather due to the interference caused to co-scheduled users. For example, in MU-MIMO scenarios were some users are using high MCS and some low MCS, then the low MCS users can be muted in the PT-RS resource elements for the "No PT-RS" case, as depicted in FIG. 8.

For low SINR, the addition of the phase noise may be drowned by the impact of the noise and interference, hence compensating for the phase noise may have little or no effect. Further, for the particular case of CPE, the addition of a phase error is more severe for higher modulation schemes. Hence in cases with small or no benefit with PT-RS and phase noise compensation, the PT-RS may be unnecessary overhead, potentially making performance worse. In some scenarios, it may even be prohibited to use PT-RS, e.g. for some DFT-S-OFDM variants.

There may be considered a method for signalling a PT-RS configuration in a DCI to a UE, where the UE receives, including at least an MCS or MCS indication, the number of MIMO layers and a resource mapping. The method may comprise
  Determining a carrier frequency associated to said DCI;
  Derive a PT-RS mapping from said DCI and carrier frequency;
  Perform radio communication using said derived PT-RS mapping.

It is generally proposed to dynamically adopt the PT-RS in relation to the transmission format, thus avoiding overhead either in term of lost data elements or in terms of unnecessary interference too high SINR users needing good CPE estimates.

Alternatively, or additionally to the above, there may be considered the following:

Phase noise is present in any practical communication system, and impact the system by introducing random phase variations of the received signal. For an OFDM system, this will lead to inter-carrier interference as well as to a common phase error (CPE) on all subcarriers. With increasing carrier frequency, the variance of the phase noise increases, leading more pronounced problems. For NR, targeting carrier frequencies of 6 GHz and above, measures need to be taken to reduce phase noise induced degradation of system performance.

In the following, design aspects of PT-RS are discussed.

Phase noise introduces both common phase errors (CPE) on all subcarriers, which lead to a rotation of the received constellation symbol, as well as inter carrier interference (ICI). The CPE is observed to dominate over the ICI introduced by phase noise. Therefore, the discussion will mainly focus on using the PT-RS for CPE estimation. It should also be mentioned that PT-RS could also be used for frequency offset estimation.

It has been observed that lower order modulation is less sensitive to phase errors, as compared to higher order modulation. It is therefore expected that the problem with CPE will be more pronounced for users in favourable channel conditions, achieving the high SNR required for higher order modulation. Therefore, PT-RS is not necessarily required to be transmitted to/from all active UEs. From a resource utilization perspective, it is therefore beneficial to only transmit PT-RS when needed. This will reduce overhead for the UL, and for DL if UE specific PT-RS are used, and interference in the case of shared PT-RS in DL.

Observation 1: PT-RS will mainly be needed for UEs scheduled for higher
  order modulation, excluding UEs in unfavourable channel conditions.

Observation 2: Transmitting PT-RS only when needed may reduce overhead
  and interference.

From the perspective of PT-RS, the UL and DL differs in a distinct way. In the UL, the received signals from different UEs are affected by individual phase noise processes. The different UEs are therefore required to transmit independent PT-RS. For the DL, the PT-RS can potentially be shared between all UEs being served by a single TRP (Transmission Point). This may be beneficial from a resource utilization perspective, since resources are shared amongst UEs. Furthermore, if designed properly, the PT-RS could be used for granular phase noise tracking used for ISI mitigation. On the other hand, since all UEs are targeted with the PT-RS, UE specific beamforming cannot be used, thus reducing the coverage of the signal, unless other means are taken. This type of always-on signal also adds to the inter-site interference. Further on, a shared PT-RS also introduces an asymmetry in the design of the UL and DL. An alternative is instead to schedule UE specific PT-RS, which allows for beamforming and thus providing improved coverage.

Observation 3: For DL, the PT-RS can either be shared or UE specific, both having a number of implications requiring further study.

In the following subsection, discussions on the implications of UE specific PT-RS in UL and DL is discussed.

Design considerations for UL PT-RS and UE specific PT-RS in DL are presented in the following.

PT-RS can either be a standalone signal, or being co-scheduled with DM-RS. Irrespective of the approach taken, due to the short coherence time of the phase noise, PT-RS may be needed to be transmitted on every OFDM symbol in a subframe. At the same time, CPE may vary slow enough to allow for accurate interpolation.

Observation 4: PT-RS could potentially be transmitted more sparsely that in every OFDM symbol.

Figure 9:
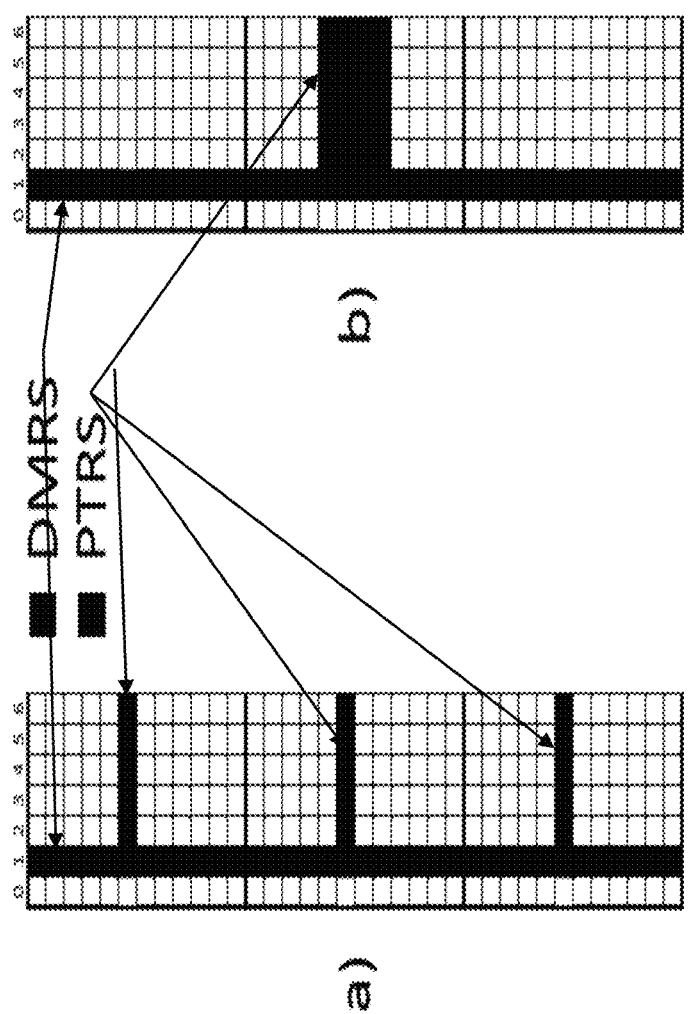
FIG. 9, showing a PT-RS placement illustration; a) Distributed PT-RS, b) Localized PT-RS.

An illustration of PT-RS placements is shown in FIG. 9. Note that the intersection between DM-RS and PT-RS has to be taken into account when designing the signal. It is important to preserve the orthogonal properties of the DM-RS, as well as preserving the available channel estimation processing gain of a continuous DM-RS allocation.

Observation 5: PT-RS should be designed and placed in such a way that it does not impact the DM-RS related processing negatively.

It may be considered letting the values for the resource elements of the PT-RS on a given subcarrier, take on the value of the DM-RS on the same subcarrier. That is, the PT-RS is obtained by repeating the DM-RS on the subcarriers on which PT-RS is present.

Proposal 1: On a given subcarrier, the PT-RS should be formed by
repeating the value of the DM-RS on that subcarrier.

If designed to be a standalone signal, PT-RS well localized in frequency is preferred, potentially covering one or several PRBs (Physical Resource Blocks). This confinement provides a processing gain when estimating the channel, needed for tracking the CPE over time. This also has the benefit of allowing the PT-RS to be transmitted without precoding, enabling sharing between users in certain scenarios. The channel estimate obtained from DM-RS could be used to improve CPE estimation performance in certain scenarios. A downside of a frequency confined signal is that it is more sensitive to frequency selective fading, as compared to a signal distributed in frequency.

By instead distributing the signal over a number of subcarriers, a diversity gain is achieved. This construction requires the PT-RS to rely on DM-RS, since an initial channel estimate is needed in order to estimate the CPE component. A benefit of this approach is that the DM-RS based channel estimate will provide a reliable reference point due to, in general, a large processing gain. How many subcarriers are needed for PT-RS, and their placement in the scheduled resources, may depend on the link quality, as well as on the scheduled bandwidth. An additional aspect to consider is how to distribute PT-RS in frequency for different subcarrier spacing. Preferably, the placement should be numerology independent. The placement and density in frequency has to be further studied.

Observation 6: The PT-RS can either be a standalone signal, or be co-scheduled with a DM-RS.

Observation 7: Placement in frequency can be made transparent to the numerology, i.e., same PT-RS subcarrier distance, irrespective of subcarrier spacing.

For MIMO transmissions, the question arises on which Tx port to use for PT-RS transmission. Since the CPE can be approximated as common to all Tx ports, transmitting the PT-RS on a single port could be sufficient. But such construction may have implications on the power density of the signal, etc.

For co-scheduled UE transmissions in the UL, within the same time-frequency resources, e.g. MU-MIMO, inter-UE interference has to be addressed. Preferably, the PT-RS could be designed to allow for a number of orthogonal signals. Due to the short coherence time of phase noise, applying coding in the time domain may not be a suitable option, instead the frequency domain need to be exploited for orthogonality. Additionally, when co-scheduling larger number of users, spatial separation of UEs should instead be applied, as well as the use of interference cancellation in the receiver. This puts requirements on which receiver type to be assumed for evaluations of PT-RS dimensioning.

Observation 8: For co-scheduling users within the same time-frequency resources in the UL, either orthogonal PT-RS signals could be transmitted, or spatial UE separation as well as interference cancelling receivers could be exploited.

Based on the above discussion, the following proposals are made, which may be implemented independently or in any combination:

Proposal 2: As a baseline, PT-RS should be transmitted only when needed.

Proposal 3: As a baseline, the PT-RS should be configurable per UE.

Proposal 4: As a baseline, the PT-RS should be transmitted together with DM-RS.

Proposal 5: Study the required PT-RS time and frequency allocation with respect to overhead and system performance.

Proposal 6: One orthogonal PT-RS for every four DM-RS ports should be sufficient to handle, e.g. MU-MIMO.

Proposal 7: Receiver capabilities in terms of number of Rx antenna branches and interference suppression capabilities need to be taken into account when dimensioning PT-RS.

Alternatively, or additionally, the following may be considered:

DL and UL CPE compensation in MIMO is discussed in the following.

In NR for higher carrier frequencies it is agreed that 3GPP should study the effect of phase noise. In terms of phase noise, the main focus is to introduce Phase Noise Compensation reference signals (PT-RS) to compensate for common phase error (CPE) which constitutes the significant part of the phase noise. When evaluating CPE-compensation, the target is to have sufficient quality estimates of the CPE for different deployment scenarios while maintaining a low overhead.

CPE compensation is more important for higher SINR and higher modulation, hence is targeted for higher bit-rate scenarios where it can be assumed that the UE is more capable in terms of receiver and number of RX/TX chains. Higher SINR is also suitable for higher order spatial multiplexing, hence evaluation assumptions for MIMO evaluations should be considered.

In higher frequencies, the smaller antennas elements sizes imply that more antenna elements can be fitted for a given area. Some of these will need to be utilized to combat path-loss. But in many scenarios, e.g. hot-spot traffic off-load scenario, more RX/TX chains can also be added compared to typical LTE scenarios. In the receiver, there is a possibility to utilize this higher number of active RX branches to allow for higher order spatial multiplexing in such hot-spot scenarios. For the UL, a larger number of uncorrelated TX phase noise components for UL MU-MIMO can scale the required number of orthogonal PT-RS signals in UL. Hence the overhead increases at least in terms of the radio interface if the resources are semi-statically assigned, but potentially also in the signaling overhead if dynamically assigning the resource mappings. The receiver assumptions for the evaluations to investigate the PT-RS structure to enable support for multiple TX-chains with uncorrelated phase noise are discussed, e.g. for MU-MIMO in UL. Observe that some larger set of PT-RS can be needed in DL for MU-MIMO also due to that beam-forming the PT-RS differently to different users may be considered.

To facilitate CPE estimation on PT-RS it is assumed here that PT-RS is generally not interfered by data from the same transmitter, e.g. due to corresponding scheduling or configuration, which may generally hold for MIMO and/or non-MIMO cases. Furthermore, it is assumed that the PT-RS is beam-formed to each receiver, e.g. UE-specific. Hence, in DL more users lead potentially to additional overhead, but the main focus here is UL MU-MIMO. When scaling the number of layers to the same user there is no need for additional overhead for PT-RS. It is proposed that to exploit this property, that is, each TX, when using multiple DM-RS ports to the same user, only uses one of the assigned ports for transmitting the PT-RS. At the same time, data on the PT-RS resources for the other ports are muted. Further users with poor channel conditions and low SINR could potentially not need any PT-RS hence blanking all layers on the PT-RS resources as they are not in need of the CPE compensation may be considered. This is an approach to lower overhead in the MIMO case, and is one option to lower overhead that should be considered. Observe that in the case when spatial multiplexing on data and then a lower order spatial multiplexing of a set of PT-RS are used, this should give the same or better quality on the PT-RS. Further, by sending the PT-RS over one of the DM-RS ports, the channel estimation and spatial interference filtering derived from the DM-RS can be reused for PT-RS reception without needing to estimate this on the PT-RS signal.

Observation 1A: Sending PT-RS over one DM-RS port allows the receiver to calculate spatial processing on DM-RS and reused this for PT-RS reception.

Figure 10:
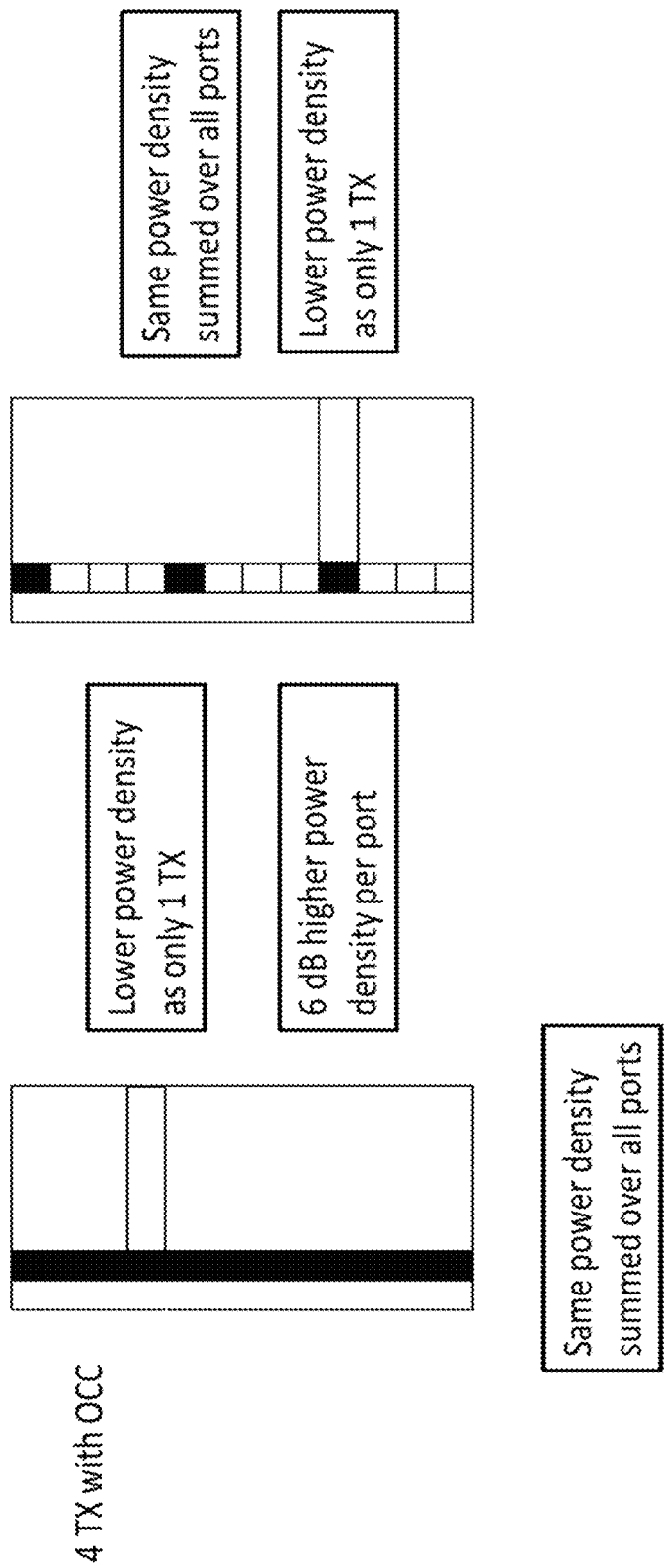
FIG. 10, showing a scenario with multiple radio circuits available, e.g. for MIMO.

This is attractive from an overhead point of view, but may also affect the CPE estimation. In particular, for both the frequency and the code multiplexing of DM-RS this solution can have power density impact for the PT-RS as depicted in FIG. 10.

Observation 2A: When using one of a multiple of TX ports the power spectral density on the PT-RS can become lower than other resource elements.

This lower power density could be adjusted, e.g. blanking adjacent data resources to redistribute power, but such a solution then costs overhead. But there is also a benefit if all transmitters are using the same sub-carrier mapping for the PT-RS as a lower power density implies that a matching lower level of interference power is experienced on the PT-RS.

Observation 3A: Using a matching mapping of PT-RS between interfering transmitters can lower the interference power on PT-RS.

Observation 4A: The experienced SINR on PT-RS will be the same or higher than the SINR on the data symbols if spatially multiplexed PT-RS uses only one out of a set of TX ports.

Continuing, the rank of the interference on PT-RS will be lower than the rank of the interference on data resource elements. Hence the multiple set of RX-chains in the receiver can effectively be used for spatial interference suppression techniques and improve estimation quality of the CPE further.

Observation 5A: Spatial interference suppression techniques will be important and effective on PT-RS.

From this discussion, we see that for PT-RS evaluations in UL MU-MIMO there is a significant difference pertaining to two different 8×8 MIMO cases, either with 8 UEs with rank 1, or 2 UEs with rank 4 each, where the second case is much easier for high quality CPE estimation. Hence for dimensioning PT-RS, the number of multiplexed UEs may be limited for a fixed number of receiver chains to not over-dimension the PT-RS resources.

In the case of one or a few dominating interferers, knowing the DM-RS to PT-RS mapping for the interferers would cater for more effective spatial interference suppression, but potentially also interference cancellation on PT-RS if the interfering PT-RS symbols are known.

Observation 6A: Interference suppression/cancellation techniques could be even more effective if the receiver has knowledge about the interfering PT-RS and DM-RS and interference is from PT-RS.

In case of uplink reception in MU-MIMO, a significant number of UE can potentially be spatially multiplexed. Each such UE will have independent phase noise, and hence needs separate PT-RS. A concern is hence that the PT-RS overhead in UL can be significant. But from previous observations, and that the receiver in UL knows the DM-RS and PT-RS mapping for at least all the users received in the same node, spatial processing can significantly lower the overhead needed for PT-RS. The dimensioning of the PT-RS in uplink is hence strongly dependent upon the number of MU-MIMO users assumed in evaluations in relation to the number of receiver chains used for interference suppression/cancellation, in particular if the receiver is capable of efficiently performing spatial separation of the users.

Observation 7A: Dimensioning of PT-RS in UL is strongly dependent upon the number of multiplexed users in relation to the number of receiver RX-chains used for interference suppression/cancellation.

This leads to the fact that in order to agree on PT-RS dimensioning in MU-MIMO, the evaluation assumptions must be agreed upon with respect to the interference suppression/rejection techniques, and the number of receiver chains in relation to the number of PT-RS. From these observations the following proposals for PT-RS evaluations in MIMO scenarios may be considered, either independently or in any combination:

Proposal 1A: Consider PT-RS overhead reduction options by considering
spatial multiplexing and processing on PT-RS assuming the same resource mapping for interfering PT-RS.

Proposal 2A: Consider the need for and options for maintaining good power
density on PT-RS without additional overhead.

Proposal 3A: As a baseline assume that spatial interference suppression
is used on PT-RS both in UL and DL.

Proposal 4A: As a baseline assume that a CPE compensation capable UE
has at least 2 receiver chains on orthogonal polarizations.

Proposal 5A: As a baseline assume that a BS has at least 2 receiver chains
on orthogonal polarizations in SU-MIMO.

Proposal 6A: As a baseline assume that a BS has at least 4 times the number of receiver chains than the number of users multiplex in UL MU-MIMO.

Possible PT-RS overhead reduction options are discussed. In particular, using one out of a multiple DM-RS ports for PT-RS in MIMO transmission is considered. Further, the spatial processing on PT-RS to get a common understanding on the needed overhead is considered.

Figure 11:
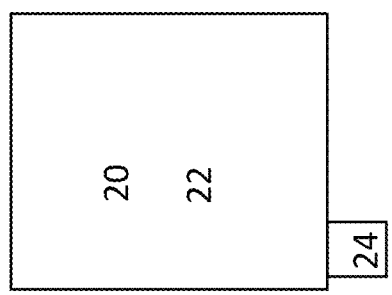
FIG. 11, showing an exemplary radio node implemented as terminal or user equipment.

FIG. 11 schematically shows a radio node or terminal 10, which may be implemented in this example as a user equipment. Terminal 10 comprises control circuitry 20, which may comprise a controller connected to a memory. Any module of the terminal, e.g. receiving module and/or transmitting module and/or decoding module, may be implemented in and/or executable by the terminal, in particular the control circuitry 20, in particular as module in the controller. Terminal 10 also comprises radio circuitry 22 providing receiving and transmitting or transceiving functionality, the radio circuitry 22 (operably, e.g. to be controlled by the control circuitry) connected or connectable to the control circuitry. An antenna circuitry 24 of the terminal 10 is connected or connectable to the radio circuitry 22 to receive or collect or send and/or amplify signals. Radio circuitry 22 and the control circuitry 20 controlling it may be adapted for receiving and/or transmitting reference signaling as disclosed herein. The terminal 10 may be adapted to carry out any of the methods for operating a terminal disclosed herein; in particular, it may comprise corresponding circuitry, e.g. control circuitry.

Figure 12:
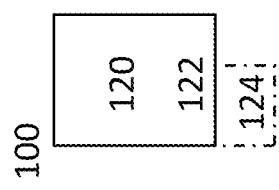
FIG. 12, showing an exemplary radio node implemented as network node like an eNodeB or gNodeB.

FIG. 12 shows an exemplary radio node 100, which may be implemented as a network node. Radio node 100 comprises control circuitry 120, which may comprise a controller connected to a memory. Any module, e.g. receiving module and/or transmitting module and/or configuring module (e.g., for configuring a terminal) of the radio node may be implemented in and/or executable by the control circuitry 120. The control circuitry 120 is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The radio node 100 may be adapted to carry out any of the methods for operating a radio node or network node disclosed herein; in particular, it may comprise corresponding circuitry, e.g. control circuitry. The antenna circuitry may be connected to and/or comprise an antenna array.

In the context of this description, a receiving node, also sometimes referred to as receiver, may be a terminal or node or device receiving reference signaling, e.g. PT-RS. A transmitting node, also sometimes referred to a transmitter, may be a terminal or node or device transmitting reference signaling, e.g. PT-RS. It should be noted that transmitter and receiver are also sometimes used to described radio circuitry, e.g. as TX or RX or in the context of TX or RX chains. The meaning of these terms while be clear from the context for a person skilled in the art.

Transmitting circuitry may be implemented as, and/or comprise, one or more transmitters. Receiving circuitry may be implemented as, and/or comprise, one or more receivers. Radio circuitry may comprise and/or be implemented as transmitting circuitry and/or receiving circuitry.

There may be considered a radio node or network node adapted for performing any one of the methods for operating a network node described herein.

There may be considered a terminal or user equipment adapted for performing any one of the methods for operating a radio node or terminal described herein.

There is also disclosed a program product comprising code executable by control circuitry, the code causing the control circuitry to carry out and/or control any one of the method for operating a radio node as described herein, in particular if executed on control circuitry, which may be control circuitry of a user equipment or a network node.

Moreover, there is disclosed a carrier (or storage) medium arrangement carrying and/or storing at least any one of the program products described herein and/or code executable by control circuitry, the code causing the control circuitry to perform and/or control at least any one of the methods described herein. A carrier medium arrangement may comprise one or more carrier media. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

Resources may generally comprise time/frequency resources for communication, and/or associated power and/or codes, e.g. depending on the multiplexing scheme used. References to resources, radio resources and/or time and/or frequency resources (e.g., subframe, slot, symbol or resource block) may refer to such resources structured according to 3GPP standards, in particular LTE and/or NR. It may be considered that decoding may comprise decoding of error detection coding and/or forward error coding. The extracted information may generally be and/or comprise control information, in particular in a scheduling assignment. It may be considered that the extracted information is received on a control channel and/or is based on control channel signaling. Control channel signaling may in particular be signaling on a physical control channel.

A terminal may be implemented as a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/or control circuitry for wireless communication. Radio circuitry may comprise for example a receiver device and/or transmitter device and/or transceiver device, and/or one or more receivers and/or transmitters and/or transceivers. Control circuitry may include one or more controllers, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Reference signaling in the uplink may be associated to a terminal, e.g. SRS. A terminal may in particular be adapted for V2x communication. A terminal may be adapted for one or more (cellular) Radio Access Technologies (RATs), e.g. LTE and/or UMTS and/or a 5G RAT, e.g. LTE Evolution and/or NR). Generally, a terminal may be any device adapted for wireless communication via D2D and/or one or more cellular RATs. A wireless communication network may comprise two or more terminals communicating via D2D communication, and/or a terminal communicating with a radio access node of a RAN (Radio Access Network) implementing one or more RATs. Such a radio access node may e.g. be an eNodeB. It may generally be considered that a terminal represents a device capable of serving as an end or termination point of a communication. A terminal may be a user equipment or phone or smart phone or computing device or sensor device or machine or vehicular device adapted for wireless communication as described herein.

A radio node or network node or base station may be any kind of radio node or base station of a wireless and/or cellular network adapted to serve one or more terminals or user equipments. It may be considered that a base station is a node or network node of a wireless communication network. A radio node or network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or radio node is adapted for one or more RATs, in particular LTE/E-UTRA. Radio circuitry may comprise for example a receiver device and/or transmitter device and/or transceiver device. Control circuitry may include one or more controllers, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled.

A radio node, in particular a network node or a terminal, may generally be any device adapted for transmitting and/or receiving radio and/or wireless signals and/or data, in particular communication data, in particular on at least one carrier. A radio node may generally be a network node or a terminal and/or user equipment. A radio node may in particular be a user equipment or a base station and/or relay node and/or micro-(or pico/femto/nano-)node of or for a network, e.g., an eNodeB or gNodeB. Transmission of data may be in uplink (UL) for transmissions from a user equipment to a base station/node/network. Transmission of data may be considered in downlink (DL) for transmission from a base station/node/network to a user equipment or terminal. The target of transmission may generally be another radio node, in particular a radio node as described herein.

An eNodeB (eNB) or gNodeB may be envisioned as an example of a radio node or network node or base station, e.g. according to an LTE standard. A radio node or base station may generally be proximity service enabled and/or to provide corresponding services. It may be considered that a radio node base station is configured as or connected or connectable to an Evolved Packet Core (EPC) and/or to provide and/or connect to corresponding functionality. The functionality and/or multiple different functions of a radio node or base station may be distributed over one or more different devices and/or physical locations and/or nodes. A radio node or base station may be considered to be a node of a wireless communication network. Generally, a radio node or base station may be considered to be configured to be a coordinating node and/or to allocate resources in particular for cellular communication between two nodes or terminals of a wireless communication network, in particular two user equipments.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively or additionally, a cell may comprise at least one carrier for UL communication/transmission and DL communication/transmission, e.g., in TDD-based approaches.

A channel may generally be a logical or physical channel. A channel may comprise and/or be arranged on one or more carriers, in particular a plurality of subcarriers.

A wireless communication network may comprise at least one network node, in particular a network node as described herein. A terminal connected or communicating with a network may be considered to be connected or communicating with at least one network node, in particular any one of the network nodes described herein.

A cell may be generally a communication cell, e.g., of a cellular or mobile communication network, provided by a node. A serving cell may be a cell on or via which a network node (the node providing or associated to the cell, e.g., base station or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., a PCell and/or a LA cell.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Generally, control circuitry may comprise integrated circuitry for processing and/or control, e.g., one or more processors and/or processor cores and/or FPGAs (Field Programmable Gate Array) and/or ASICs (Application Specific Integrated Circuitry). Control circuitry may comprise and/or be connected to and/or be adapted for accessing (e.g., writing to and/or reading from) memory, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory may be adapted to store code executable by control circuitry and/or other data, e.g., data pertaining to communication, e.g., configuration/s and/or address data of nodes, etc. Control circuitry may be adapted to control any of the methods described herein and/or to cause such methods to be performed, e.g., by the radio node. Corresponding instructions may be stored in the memory, which may be readable and/or readably connected to the control circuitry. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry.

Radio circuitry may comprise receiving circuitry (e.g., one or more receivers) and/or transmitting circuitry (e.g., one or more transmitters). Alternatively, or additionally, radio circuitry may comprise transceiving circuitry for transmitting and receiving (e.g., one or more transceivers). Radio circuitry may generally comprise, for example, a receiver device and/or transmitter device and/or transceiver device.

Antenna circuitry may comprise one or more antennas or antenna elements, which may be arranged in an antenna array. It may be considered that antenna circuitry comprises one or more additional elements and/or is connected or connectable to one or more additional elements, e.g., wiring.

Configuring a radio node, in particular a user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., regarding a freeze interval and/or a transmission start interval. A radio node may configure itself, e.g., based on configuration data received from a network or network node.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE.

A carrier may comprise a continuous or discontinuous radio frequency bandwidth and/or frequency distribution, and/or may carry, and/or be utilized or utilizable for transmitting, information and/or signals, in particular communication data. It may be considered that a carrier is defined by and/or referred to and/or indexed according to for example a standard like LTE. A carrier may comprise one or more subcarriers. A set of subcarriers (comprising at least one subcarrier) may be referred to as carrier, e.g., if a common LBT procedure (e.g., measuring the total energy/power for the set) is performed for the set. A channel may comprise at least one carrier. A channel may in particular be a physical channel and/or comprise and/or refer to a frequency range. Accessing a carrier or channel may comprise transmitting on the carrier. If accessing a carrier or channel is allowed, this may indicate that transmission on this carrier is allowed.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DM-RS according to 3GPP and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

A channel may generally be a logical or physical channel. A channel may comprise and/or be arranged on one or more carriers, in particular a plurality of subcarriers. A control channel may be such a channel. A communication may generally involve transmitting and/or receiving messages, in particular in the form of packet data. A message or packet may comprise control and/or configuration data and/or payload data and/or represent and/or comprise a batch of physical layer transmissions. Control and/or configuration information or data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Generally, a message may comprise one or more signals and/or symbols.

Data may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Terminal-specific (or UE-specific) transmission may be addressed and/or intended and/or encoded for a specific terminal or UE (or a group thereof), e.g. by encoding and/or spreading with a corresponding identification, e.g. a RNTI.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise:
3GPP Third Generation Partnership Project
eNB Enhanced NodeB
CRS Cell-specific Reference Signal
DM-RS De-Modulation Reference Signal
DCI Downlink Control Information
LTE Long Term Evolution
MIMO Multiple Input Multiple Output
MU Multi-user
PT-RS Phase Tracking RS
RS Reference Signal
TM Transmission Mode
TTI Transmission Time Interval
UE User Equipment
DL Downlink, pertaining to transmission from a network node to a terminal
UL Uplink, pertaining to transmission from a terminal to a network node
NR New Radio
RNTI Radio Network Temporary Identifier Transmission in the context of this disclosure may pertain to wireless transmission in a RAN.

What is claimed is:

1. A transmitting node configured for use in a Radio Access Network, the transmitting node comprising:
control circuitry; and
radio circuitry;
wherein the control circuitry and radio circuitry are configured to transmit, based on one or more transmission parameters, reference signaling and/or signaling including reference signaling, wherein the presence or not of phase tracking reference signaling in the reference signaling depends on a number of scheduled spatial layers for the transmission and wherein the one or more transmission parameters comprise a Modulation and Coding Scheme (MCS).

2. The transmitting node of claim 1, wherein the one or more transmission parameters are configured or indicated with a downlink control information (DCI) message.

3. The transmitting node of claim 1, wherein the transmitting node is a terminal or a network node.

4. The transmitting node of claim 1, wherein the transmitting node is configured to transmit in downlink, and wherein the transmitting node is configured to transmit terminal-specific and/or beam-formed reference signaling and/or signaling including reference signaling.

5. A method for operating a transmitting node in a Radio Access Network, the method comprising:
transmitting, based on one or more transmission parameters, reference signaling and/or signaling including reference signaling, wherein the presence or not of phase tracking reference signaling in the reference signaling depends on a number of scheduled spatial layers for the transmission and wherein the one or more transmission parameters comprise a Modulation and Coding Scheme (MCS).

6. The method of claim 5, wherein the one or more transmission parameters are configured or indicated with a downlink control information (DCI) message.

7. The method of claim 5, wherein the transmitting node is a terminal or a network node.

8. The method of claim 5, wherein said transmitting is in downlink, and wherein said transmitting is terminal-specific and/or beam-formed.

9. A non-transitory computer-readable medium comprising, stored thereupon, code executable by control circuitry of a transmitting node, the code being configured to cause the control circuitry to control the transmitting node to transmit, based on one or more transmission parameters, reference signaling and/or signaling including reference signaling, wherein the presence or not of phase tracking reference signaling in the reference signaling depends on a number of scheduled spatial layers for the transmission and wherein the one or more transmission parameters comprise a Modulation and Coding Scheme (MCS).

* * * * *